United States Patent
Rockwood

(10) Patent No.: US 6,913,438 B2
(45) Date of Patent: Jul. 5, 2005

(54) PUMP LUBRICATION SYSTEM INCLUDING AN EXTERNAL RESERVOIR

(75) Inventor: Robert E. Rockwood, Windham, NH (US)

(73) Assignee: Environamics, Hudson, NH (US)

( * ) Notice: Subject to any disclaimer, the term of this patent is extended or adjusted under 35 U.S.C. 154(b) by 255 days.

(21) Appl. No.: 10/158,864

(22) Filed: Jun. 3, 2002

(65) Prior Publication Data

US 2002/0146315 A1 Oct. 10, 2002

Related U.S. Application Data

(63) Continuation-in-part of application No. 08/645,904, filed on May 14, 1996, now abandoned.

(51) Int. Cl.[7] .............................................. F04D 29/06
(52) U.S. Cl. ....................... 415/112; 415/175; 415/177; 415/229; 417/423.8; 417/423.13; 384/465; 384/473; 184/6.4; 184/6.22; 184/6.24; 184/11.2; 184/13.1; 184/96; 184/104.1; 184/108; 222/157
(58) Field of Search ......................... 415/109, 111–112, 415/175, 177, 229, 230; 417/423.8, 423.12, 423.13; 384/465, 473; 184/6.4, 6.22, 6.26, 6.24, 11.1, 11.2, 13.1, 96, 104.1, 108, 105.1; 73/305, 317–322; 222/157; 116/276, 227–229

(56) References Cited

U.S. PATENT DOCUMENTS

| | | | | |
|---|---|---|---|---|
| 526,025 A | * | 9/1894 | Dashiell | 184/96 |
| 862,913 A | * | 8/1907 | Hill | 184/96 |
| 1,192,693 A | * | 7/1916 | Schultz | 73/322 |
| 1,567,821 A | * | 12/1925 | Sweetland | 73/445 |
| 1,589,025 A | * | 6/1926 | Wilson | 222/157 |
| 1,778,840 A | * | 10/1930 | Wale | 73/322 |
| 2,255,310 A | * | 9/1941 | D'Arcey | 73/317 |
| 2,531,774 A | * | 11/1950 | Guthmann | 73/321 |
| 2,738,032 A | * | 3/1956 | Kirk | 184/96 |
| 2,802,548 A | * | 8/1957 | Mart et al. | 184/11.1 |
| 2,950,943 A | * | 8/1960 | Forrest | 184/13.1 |
| 3,122,017 A | * | 2/1964 | Barr et al. | 73/322 |
| 3,983,958 A | * | 10/1976 | Swearingen | 184/108 |
| 4,700,808 A | * | 10/1987 | Haentjens | 184/11.2 |
| 4,872,530 A | * | 10/1989 | Burgess | 184/96 |
| 5,150,769 A | * | 9/1992 | Major et al. | 384/473 |
| 5,156,523 A | * | 10/1992 | Maier | 415/175 |
| 5,341,900 A | * | 8/1994 | Hikes | 184/104.1 |
| 5,513,964 A | * | 5/1996 | Rockwood | 417/423.13 |
| 5,632,608 A | * | 5/1997 | Rockwood | 417/423.13 |
| 5,647,735 A | * | 7/1997 | Rockwood | 417/423.13 |
| 6,551,055 B2 | * | 4/2003 | Rockwood | 415/111 |

FOREIGN PATENT DOCUMENTS

| | | | | | |
|---|---|---|---|---|---|
| CA | 737819 A | * | 7/1966 | | 384/473 |
| GB | 2248278 A | * | 1/1992 | | 384/473 |

* cited by examiner

*Primary Examiner*—Christopher Verdier
(74) *Attorney, Agent, or Firm*—Liniak, Berenato & White

(57) ABSTRACT

A circulating lubrication system for a centrifugal pump, or other rotating equipment utilizing an oil sump, is disclosed. The lubrication system includes an external reservoir located distant from the main lubrication chamber, so that lubricating fluid from the main misting chamber is forced out of the main chamber, cooled and cleaned (i.e. filtered) in the external reservoir, and thereafter fed back into the main lubricating chamber. In such a manner, the lubrication system maintains substantially clean, cool, and moisture free lubricating fluid in the main misting chamber and reduces the required downtime of the device. Thus, the life span of the device is lengthened while at the same time production is increased.

13 Claims, 12 Drawing Sheets

Figure 1:
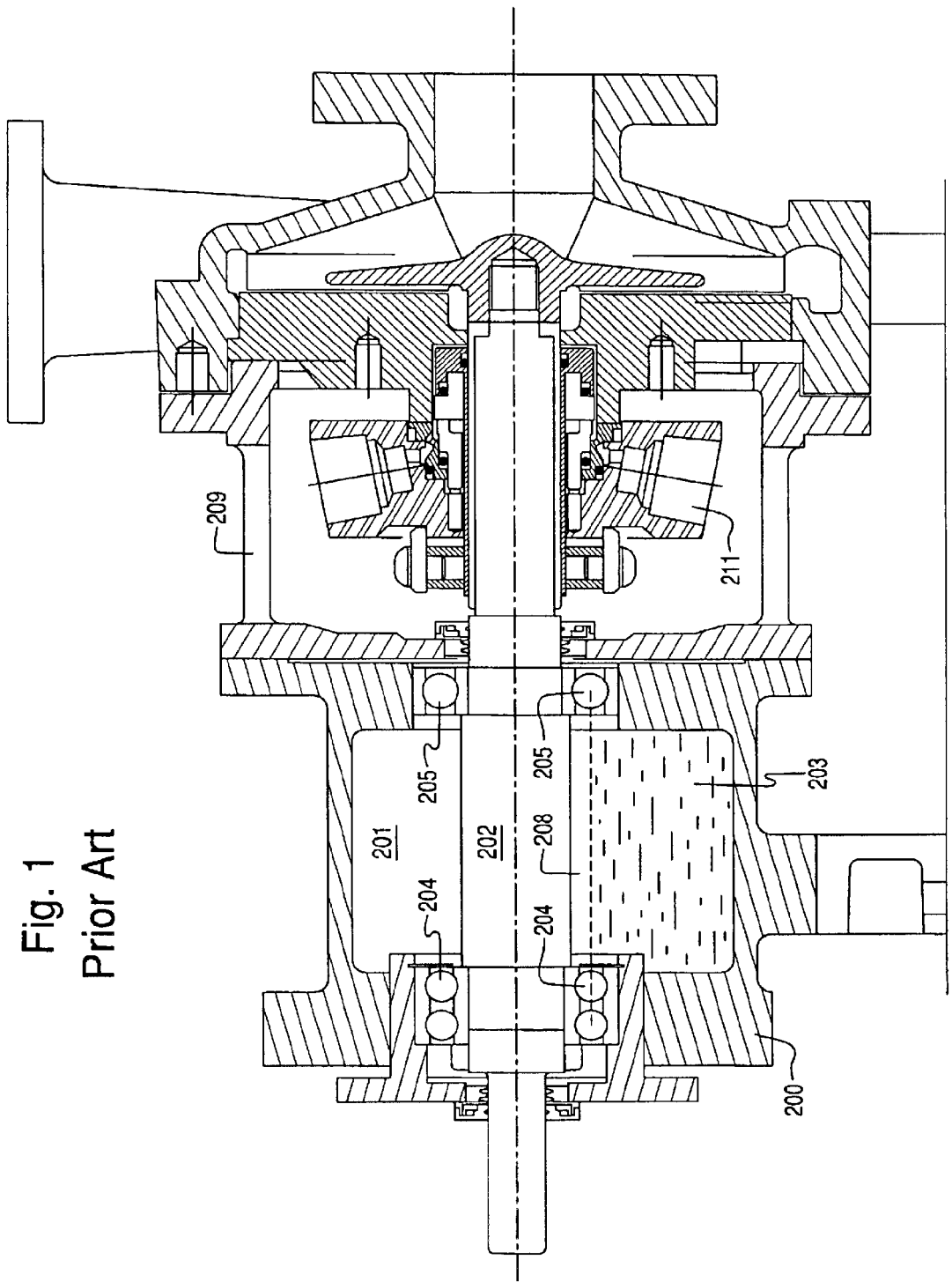

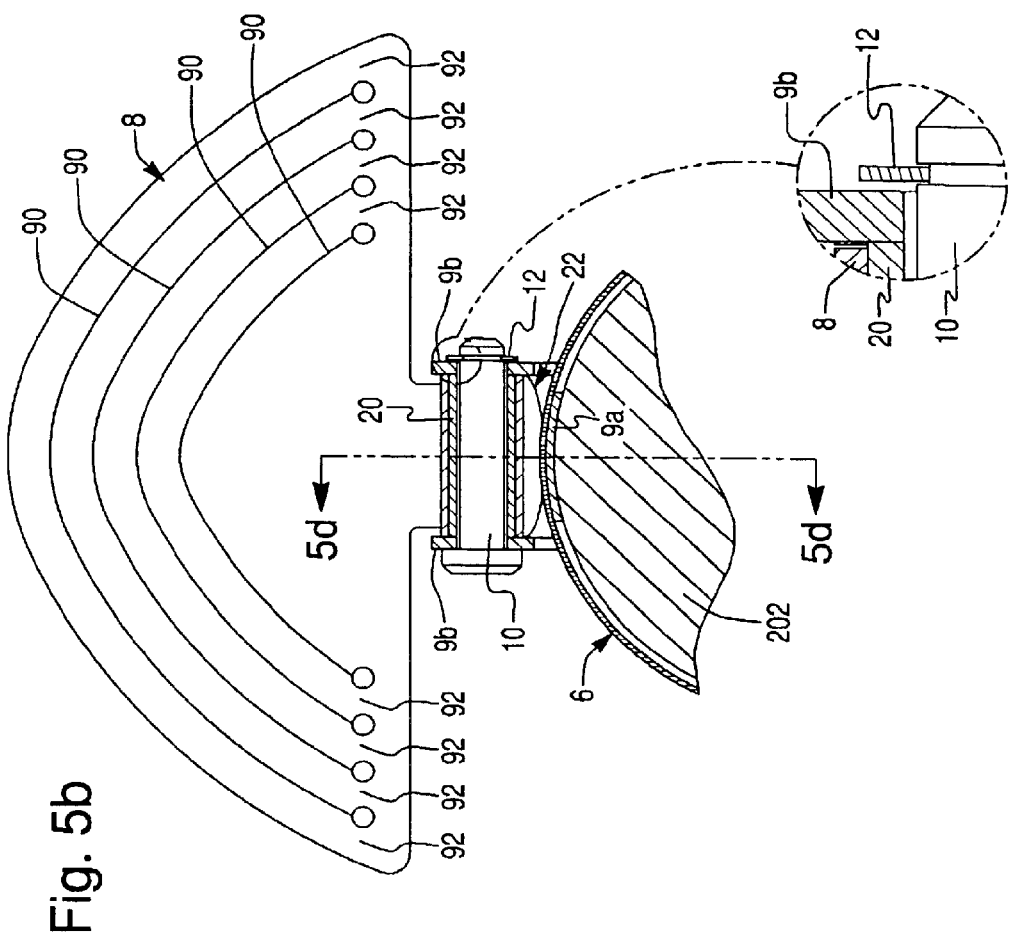
Fig. 5b
Fig. 5c
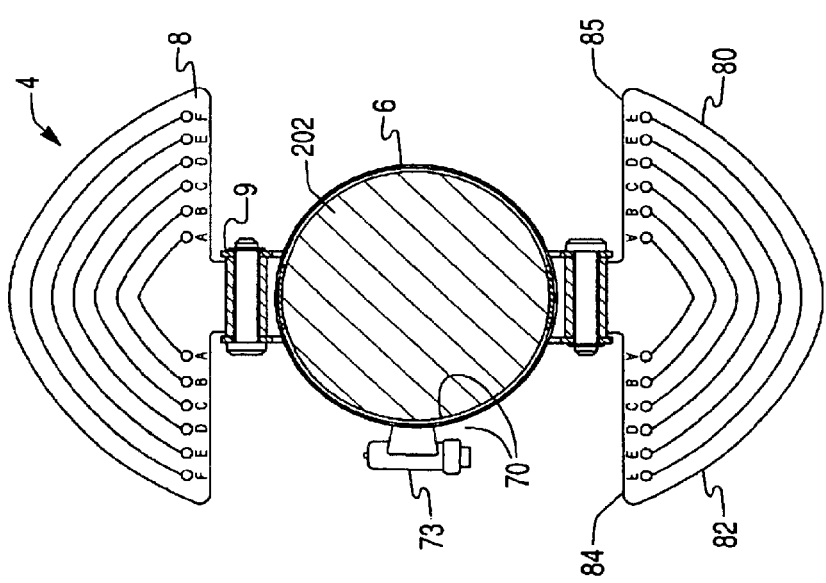
Fig. 5a

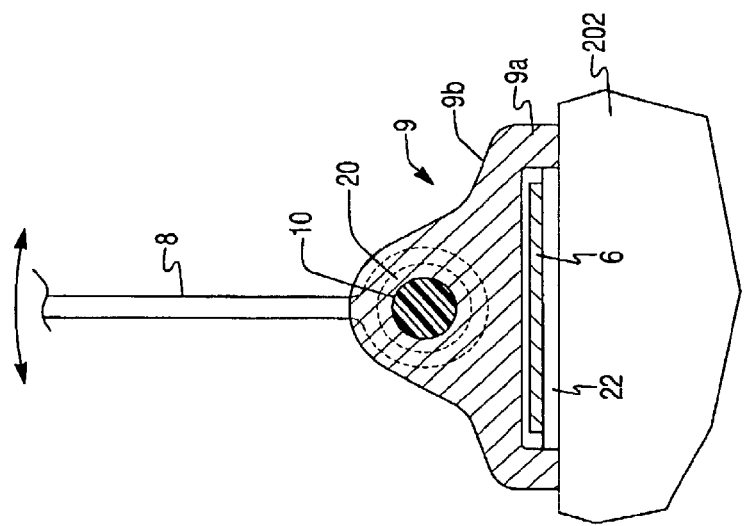

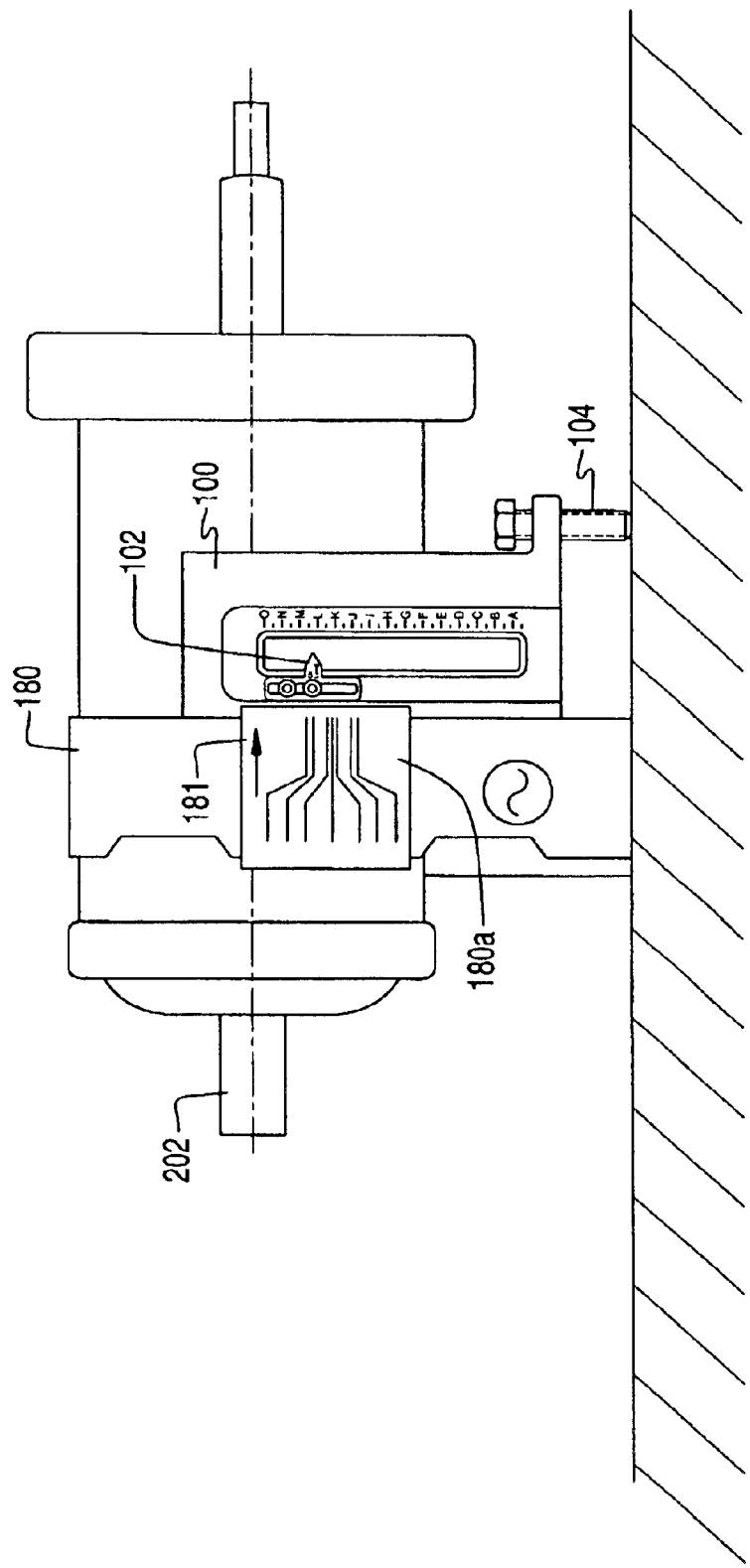

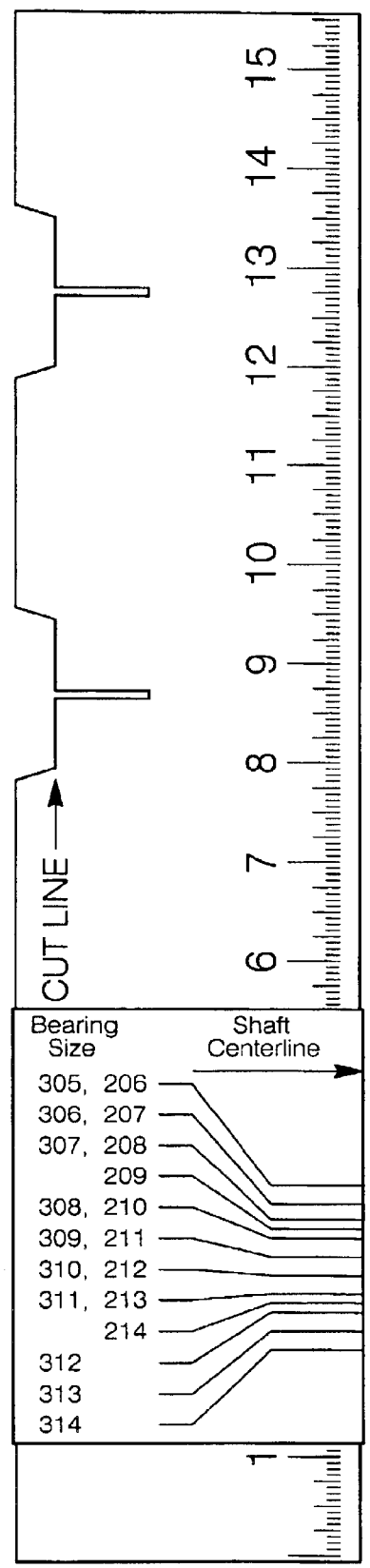

PUMP LUBRICATION SYSTEM INCLUDING AN EXTERNAL RESERVOIR

This application is a continuation-in-part of application Ser. No. 08/645,904, filed May 4, 1996, now abandoned.

This invention relates to a lubrication system for use in a pump or the like. More particularly, this invention relates to an oil misting system for a centrifugal chemical processing pump including an external reservoir provided for the purpose of reducing maintenance requirements, and maintaining clean and temperature efficient lubricating fluid in the pump misting chamber.

BACKGROUND OF THE INVENTION

Environmentally hazardous fluids, such as acids, oils, and toxins, which can cause serious harm to the environment often need to be pumped throughout fluid flow systems from one location to another. Centrifugal pumps including a motor driven impeller affixed to a pump shaft are typically utilized in, pumping such fluids. The shafts of such pumps are typically rotatably supported against radial movement and vibration by conventional pump shaft bearings (e.g. ball bearings). These bearings must be continually lubricated throughout the operation of the pump in order to reduce maintenance requirements and maintaining a satisfactory operating life of the bearings and thus the pump.

Conventional lubricating fluids, such as oils, are typically used to lubricate such pump shaft bearings. See, for example, commonly owned U.S. Pat. No. 5,340,273, the disclosure of which is hereby incorporated herein by reference. The lubricating fluid is generally housed in a bearing lubrication or misting chamber surrounding the pump shaft. Conventional pumps typically include ball bearings, as disclosed in the '273 patent, located within or adjacent the misting or lubricating chamber, for supporting the pump shaft. In the prior art, these shaft supporting bearings are often lubricated by positioning the lubricant level within the lubrication chamber at a level or position about half-way up the bottom bearing ball. Maintaining the lubricating oil level at such a position necessarily translates into the bearing balls plowing through the lubricating fluid (e.g. oil) when the shaft and supporting bearings are rotated. This results in undesirable heat generation within the bearings and adjacent the pump shaft, such heat generation being caused by the friction created by the bearing balls continually passing through the lubricating oil. Such heat generation increases maintenance requirements and reduces the operating life of the bearings.

Dirt, contaminants, and moisture in the lubricant is also a problem. The presence of such contaminants in the lubricating fluid results in increased wear and greatly reduced life of the bearings and thus additional maintenance.

In the prior art, when it is time to "change the oil" in such pumps, it is necessary to shut down the pump, remove an oil plug typically located at the bottom of the misting chamber, drain the oil, close the plug, and thereafter fill the chamber with clean oil from the top. Unfortunately, this results in substantial downtime of the pump, undesirable labor requirements, and strong reliance upon operators in the field for inserting/removing the proper amount and type of lubricating fluid. Also, an undesirably large amount of oil is used over time.

It is apparent from the above that there exists a need in the art for a lubrication system wherein: (i) the system is easily retrofitable to all pumps and similar equipment with a simple and easy to use installation kit; (ii) the lubricating fluid in the system is maintained in a clean and moisture free state without requiring frequent "oil changes"; (iii) the temperature of the lubricating fluid in the misting chamber is maintained at the lowest possible level so as to increase the life of the mechanical components therein; (iv) the system permits an operator to visually check the oil level and visual appearance of the oil in the pump without having to shut it down; and (v) a larger capacity lubricant reservoir is provided.

It is the purpose of this invention to fulfill the above-described needs in the art as well as other needs apparent to the skilled artisan from the following detailed description of this invention.

SUMMARY OF THE INVENTION

Generally speaking, this invention fulfills the above-described needs in the art by providing a universal, easy to install circulating lubrication system retrofit kit for lubricating shaft supporting bearings which rotatingly support a shaft, the circulating lubrication system comprising:

a misting chamber surrounding the shaft and located proximate the bearings to be lubricated;

a member affixed to and rotating with the shaft for causing lubricant to lubricate the bearings;

a reservoir located remote from and in fluid communication with the misting chamber;

an oil level in the misting chamber maintained below the lower balls of the bearings;

circulating means for circulating the lubricant from the misting chamber to the reservoir and thereafter back to the misting chamber from the reservoir; and means for filtering the lubricant in the reservoir in order to maintain filtered lubricant in the misting chamber so as to prolong the operating life of the bearings;

a reservoir which includes heat removing fins for reducing the temperature of the oil;

a reservoir fitted with a moisture removing desiccant chamber for removing moisture from the air within the chamber preventing that moisture from contaminating the oil;

an easy to use installation kit with instructions, charts, easily adjustable oil mister blade assembly, versatile finned reservoir multiple entry and exit port choices, drain valve, all required fittings and tubing, desiccant chamber, adjustable level arrow, full length sight glass, replaceable filter, optional adjustable support screws and installation slide template used to determine and set the appropriate oil height for any pump or similar equipment.

According to certain preferred embodiments of this invention, the circulating lubrication system including the external reservoir is used in conjunction with a chemical processing centrifugal pump.

This invention still further fulfills the above-described needs in the art by providing a method of maintaining substantially clean and moisture free lubricating fluid in a misting chamber of a pump, the pump including a rotatable shaft and bearings to be lubricated for supporting the shaft, the method comprising the steps of:

providing the pump including the rotatable shaft and supporting bearings;

providing lubricating fluid in the misting chamber proximate the bearings to be lubricated;

lubricating the bearings by dispersing-the lubricating fluid throughout the misting chamber;

forcing the fluid out of the misting chamber, through a first conduit, and into a fluid reservoir spaced from the misting chamber;

removing moisture from the air within the chamber before it contaminates the oil;

removing heat by way of the fins on the reservoir;

filtering the fluid in the reservoir; and causing the filtered fluid to flow back into the misting chamber thereby maintaining substantially clean lubricating fluid in the misting chamber.

This invention will now be described with respect to certain embodiments thereof, accompanied by certain illustrations, wherein:

IN THE DRAWINGS

FIG. 1 is a side partial cross-sectional view of a typical pump with the oil level set half way up the lower bearing ball;

FIG. 2 is an exemplary embodiment of the invention wherein the conventional pump shown in FIG. 1 is fitted with the easily adjustable oil misting blade assembly;

FIG. 3 is an alternate view of the pump shown in FIG. 2 showing the external oil reservoir with fins, adjustable oil level arrow, adjustable support screws, and cover with desiccant chamber;

FIG. 4 is a cross sectional end view taken along section line IV—IV of FIG. 3 showing the adjustable oil misting blade assembly mounted on the shaft, as well as fittings, tubing, drain valve, plugs, reservoir with fins, adjustable support screws, filter inside the reservoir, and reservoir cover with desiccant chamber.

FIGS. 5*a*–5*d* show the details of the oil mister blade assembly.

FIGS. 6*a*–6*c* show the oil reservoir with the fins, adjustable oil lever arrow, embossed oil level presets (lettered "A" through "O"), and versatile multiple entry and exit ports.

FIG. 7 shows the provided installation template for setting a correct spatial relation for the lubrication components in conjunction with the pump.

FIG. 8 shows the relationship of the installation template as used to measure the position of the outlet fitting for the pump.

FIG. 9 shows the relationship of the installation template as used to measure the correct setting of the adjustable oil level arrow and adjustable support screws.

FIGS. 10*a* and 10*b* illustrate how the slide rule template 180 can alternatively be used to measure the proper size of the blade 8 of the dispenser 4.

FIG. 11 shows the preferred design of the slide rule template of this invention.

DETAILED DESCRIPTION OF PREFERRED EMBODIMENTS

Referring now more particularly to the accompanying drawings in which like reference numerals indicate like parts throughout the several views.

Below described is a circulating lubrication system according to certain embodiments of this invention used in conjunction with a centrifugal pump including a centrally located rotating shaft. However, it will be understood by those skilled in the art that the lubrication system and corresponding external reservoir according to certain embodiments of this invention may be used in conjunction with other rotating equipment that utilize a lubricant sump for the purpose of lubricating shaft supporting bearings.

FIG. 1 illustrates a conventional centrifugal pump including bearings designed for oil lubrication. Bearing lubrication may be accomplished by internal oil misting, internal ring oil lubrication, external sources of oil, and/or flood oil.

Referring to FIG. 1, the pump includes bearing frame 200, lubrication oil 203, reservoir chamber 201, rotatable pump shaft 202, bearings 204 and 205, rigid frame adapter 209, and conventional mechanical seal 211. Lubricant 203 is provided in the lubricant oil reservoir chamber 201 and preferably maintained at a suitable level 208 depending on the operating characteristics of the pump and bearings 204, 205.

FIG. 2 is a side elevational partial cross-sectional view of the lubrication system of a centrifugal chemical processing pump according to a particular embodiment of this invention. Illustrated in FIG. 2 is surrounding pump housing 3, in which misting or lubricating chamber 201 is defined. The centrifugal pump includes central rotating shaft 202 disposed between the pump motor and pump impeller. The fluid to be pumped is actually pumped by the impeller 213, which in turn is driven by the motor (not shown) via elongated shaft 202.

The misting or lubricating system illustrated in FIG. 2 includes dispenser 4 made up of supporting band 6 to which a plurality of lubricant dispensing members or blades 8 are attached through a vane holder 9. Blades 8 are collapsible in that they are pivotally attached to vane holder 9 so that they may pivot or flop (i.e. collapse) downward during both (i) insertion of the dispenser 4 into misting chamber 201 through bore 32; and (ii) during non-use of the pump when shaft 202 is not moving. In other words, blades 8 are collapsible by way of their mounting arrangement so as to allow the dispenser 4 to pass through the annular bore 32 that the bearing fits through during installation. The pitch of blades 8 can be altered from a flat pitch or angularity to a heavy pitch in order to produce different misting effects.

One unique feature of the dispenser 4 is the split supporting band 6 that permits the dispenser to be mounted to an existing shaft without removing existing bearings. The collar is adjustable to fit a wide range of shaft diameters with one standard kit.

Alternatively, when the annular bore 32 through which the dispenser 4 may be inserted is defined by the inner or interior diameter of a hole in the pump frame 3 (on either side of chamber 201), the diameter of dispenser 4 when members 8 are collapsed is less than the diameter of the bore. Thus, the dispenser with collapsed blades 8 may be inserted through the bore and into misting chamber 201. However, once in chamber 201, during pump operation when shaft 202 is rotated, blades 8 "stand up" so that the operating outer diameter of dispenser 4 is greater than the diameter of the bore 32 (and greater than the inner diameter of bearing frame(s) 3, and greater than the diameter defined by the radius at which bearing balls 21 roll in their raceways). The operating diameter of dispenser 4 is of course defined by the diameter around the outer periphery of blades 8 as they rotate within chamber 201.

When the pump shaft 202 is driven by the pump motor, supporting band 6 and blades 8 affixed thereto rotate along with shaft 202 within annular lubricating chamber 201 thereby dispersing lubricating fluid (e.g. oil) throughout chamber 201 as shown in FIG. 1. When shaft 202 is rotated, the blades 8 are caused to extend radially away from shaft 202 (i.e. stand up) due to the centrifugal force created by rotation of the shaft 202. Thus, during rotation of shaft 202 when the pump is pumping, the outer diameter of the dispenser (defined by the outer diameter of blades 8) is greater than the inner diameter of the stationary hole or bore through which it was inserted.

Dispensing members or blades 8 dip into the lubricating fluid 203 below fluid level 19 when shaft 202 is rotated thereby dispensing or flinging the lubricant 203 throughout chamber 201 so that the lubricant makes its way into auxiliary passageways and therefrom down into auxiliary chambers (not mentioned herein). It is noted that the passageways and chambers defining a lubricant delivery passageway may take many forms not discussed herein.

Figure 2:
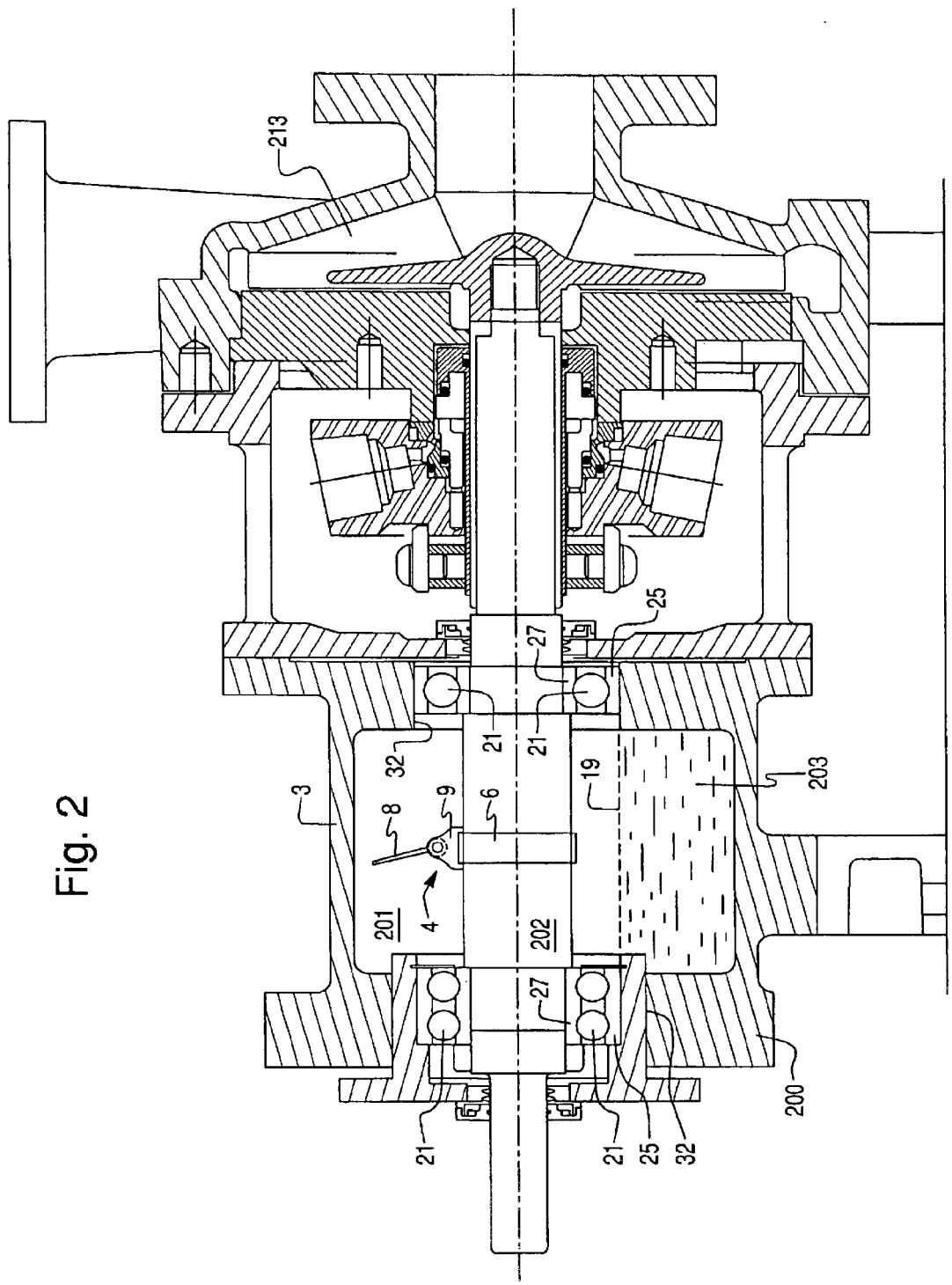

As shown in FIG. 2, the lubricating fluid level 19 within chamber 201 is, according to certain embodiments of this invention, maintained at a level below bearing rollers 21. This lower lubricant level 19 requires a dispenser 4 with a larger working outer diameter than would otherwise be necessary so that the members 8 can reach into the lubricant below level 19.

Outer bearing portions or outer races 25 work in conjunction with inner bearing portions (i.e. inner races) 27 (affixed to shaft 202) so as to define roller raceways therebetween in which bearing rollers 21 move during shaft 202 rotation. Together, bearing rollers 21 in combination with bearing races 25 and 27 make up at least one pair of the bearings of centrifugal pump which are provided for the purpose of supporting shaft 202 during rotation thereof.

When the lubricant 13 is dispensed throughout chamber 201 by blades 8, the lubricant makes it way through bearings and also down auxiliary passageways, which may be present in some pumps and into chambers on both ends of chamber 201. Once in auxiliary chambers, the lubricant is permitted to lubricate the bearing raceways, frames, and balls on all sides thereby improving performance. From auxiliary chambers, some of the lubricating fluid makes its way back into main chamber 201 through the gap between bearing races or frames 25 and 27. However, some of the lubricant from annular auxiliary chambers makes its way back into main chamber 201 by way of passageways (not shown) disposed below outer bearing races 25. Auxiliary passageways, auxiliary chambers, and passageways are designed so that the lubricating fluid makes its way through chambers and passageways due to the force of gravity and back into main misting chamber 201.

As will be discussed in detail below, main chamber 201 may, according to certain embodiments, be provided with an outlet and inlet in communication with an external lubricant reservoir. These are provided so that the lubricating fluid (e.g. oil) from chamber 201 may be circulated out of the pump, cooled and filtered in the external reservoir, and thereafter recirculated back into chamber 201 by way of the inlet (see FIGS. 3 and 4).

Discussion will now be made of the specific structure and function of the dispenser 4 shown generally in FIG. 2 and shown in greater detail in FIGS. 5a–5d. FIG. 5a is an end view illustrating the lubricant dispenser 4 of FIG. 2. In FIG. 2, pump shaft 202, supporting band 6 and vane holder 9 are illustrated cross-sectionally, while the blade 8 is illustrated in an elevational manner. As shown, a plurality of dispensing members or blades 8 is attached to shaft 202 for rotation therewith by way of base support band 6. Support band 6 is wrapped around and affixed to pump shaft 202 for rotation therewith. Support band 6 mounts a plurality of vane holders 9 extending radially outward therefrom. Vane holders 9 are provided for pivotally mounting the dispensing blades 8.

Each holder 9 includes a mounting base 9a through which the support band 6 passes and a pair of support legs 9b having an aperture defined therein for the purpose of receiving elongated support shaft or dowel 10 (see FIGS. 5b and 5c).

With reference to FIGS. 5b and 5c, the vane holder and mounting structure will now be described. The vane holder 9 is a u-shaped member having a base portion through which the band 6 passes and support legs 9b formed with an aperture. A spring insert 22 in the form of a u-shaped resilient member is disposed between the two support legs 9b. The spring insert 22 is also formed with a pair of apertures that align with the apertures of the support legs 9b. The dispensing blade 8 is fitted onto a bearing sleeve 20, and the bearing sleeve 20 is aligned with the apertures of the support legs 9b. The support shaft 10 passes through one support leg 9b then through the spring insert 22 and the bearing sleeve 20, through the second end of the spring insert 22 and then through the second support leg 9b. The shaft 10 is retained in place by a suitable fastener, preferably a retaining clip 12.

The spring insert 22 is designed to retain the vane holder 9 in place relative to the support band 6 via a friction-fit arrangement. With this arrangement, the vane holder 9 may be slid along the band 6 to a desired location where the holder 9 is retained in place using the friction-fit arrangement. Of course, other retention systems may be employed to selectively retain the vane holder 9 relative to the band 6.

Each blade 8 is free to pivot about the axis defined by the shaft 10 so that each blade 8 can pivot in either direction about the shaft 10 to which it is pivotally and movably attached. Because each blade 8 can pivot downward in either direction about 90° relative to its extended or "stand up" position (FIG. 5a), the lubricant dispenser 4 may be inserted into chamber 201 through the opening defined by bore 32. This is advantageous in that a dispenser 4 may be inserted into chamber 201, with the operating outer diameter of dispenser 4 (defined by the outer diameter of blades 8) being greater than the diameter of the opening through which the dispenser is originally fed. Typically, dispenser 4 will be inserted into chamber 11 with the shaft and bearings through the annular opening defined by hole or bore 32 in the pump housing.

FIG. 5d is a sectional view taken along section line VI—VI of FIG. 5b showing the vane holder assembly of the dispensing element including the vane or blade 8, vane holder 9, bearing sleeve 20 and shaft 202. As shown in FIG. 5d, the blade 8 is formed to wrap around the bearing sleeve 20.

The blade(s) 8 in its operating position is caused to extend radially away from the center of shaft 202 due to the centrifugal force created by rotation of the shaft. In other words, each dispensing member or blade 8 is in the position of FIG. 5d when pump shaft 202 is caused to rotate during operation by the pump motor. However, as discussed above, because each blade 8 is pivotally mounted to holder 9, during non-rotation of shaft 202, the blades 8 on the upper side of the pump shaft flop or pivot downward about the axis defined by holder 9. As illustrated by the arrow in FIG. 5d, each blade 8 may pivot about the axis defined by shaft 10 about 90° in either direction from its illustrated operating position.

Also illustrated in FIG. 5a are the two ends 70 of band 6. Each end 70 are adapted to receive a fastener 73, such as a locking fastener, bolt and corresponding nut or other retainer, for the purpose of securing band 6 around the external periphery of shaft 202. In such a manner, support band 6 is wrapped around the outside of shaft 202, with the two ends 70 of band 6 being secured to one another by way of fastener 73. A corresponding nut may be provided on the end of fastener 73 for the purpose of maintaining support band 6 in a secured position affixed around the pump shaft for rotation therewith.

It is also important to note, relative to FIGS. 5a–5d, that during operation, the distal, or radially most outward, edge 80 of blades 8 is curved or arc-shaped. The curves of the edge 80 of blades 8 are formed so that, as shown in FIG. 5a, if the blades were connected, the center of the resulting circle would be outside the center of shaft 202. Also, it is edges 80 of blades 8 which slice into the lubricating fluid (below level 19) during rotation of shaft 202 thereby flinging or dispensing the fluid 13 throughout chamber 201 so as to lubricate the adjacent ball bearings. Due to the shape of the edges 80, an intermediate portion 82 engages the lubricating fluid before the terminal ends 84, 85 of each blade 8. It has been found that the prior art blade configuration causes the leading edge to strike the lubrication fluid during operation, and this prior art arrangement causes undesirable splashing or spraying of lubricating fluid. Because the blades 8 of this invention are designed to strike the lubricating fluid at an intermediate portion 82 and not the leading edge, the undesirable splashing or spraying is substantially reduced or eliminated.

Figure 3:
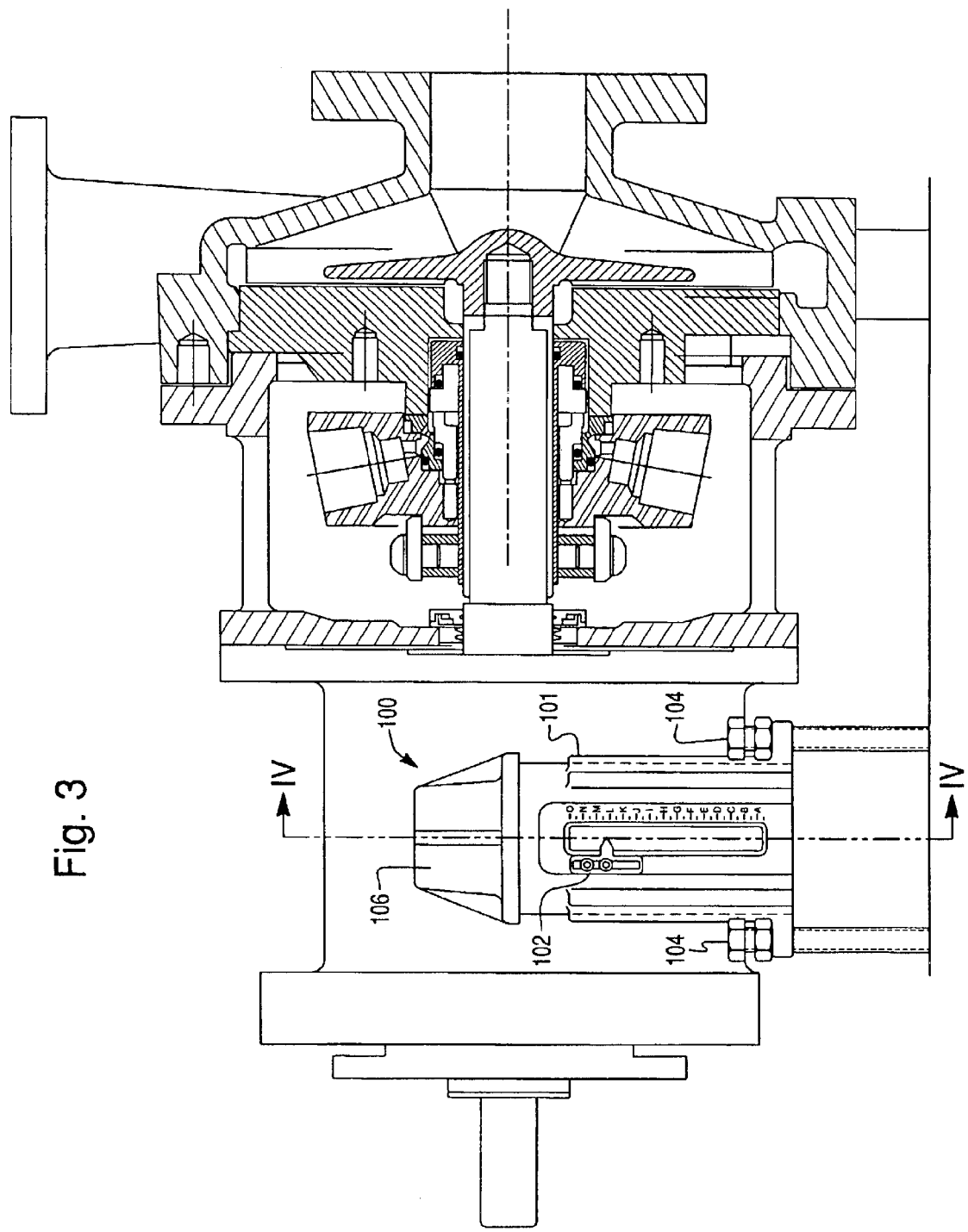
Figure 6C:
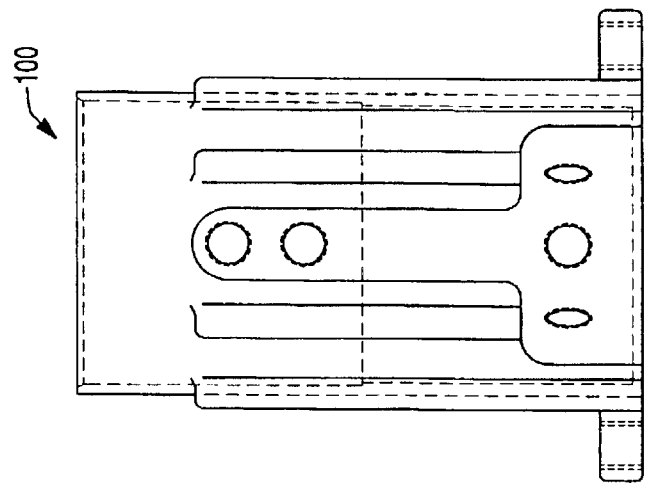
Figure 6B:
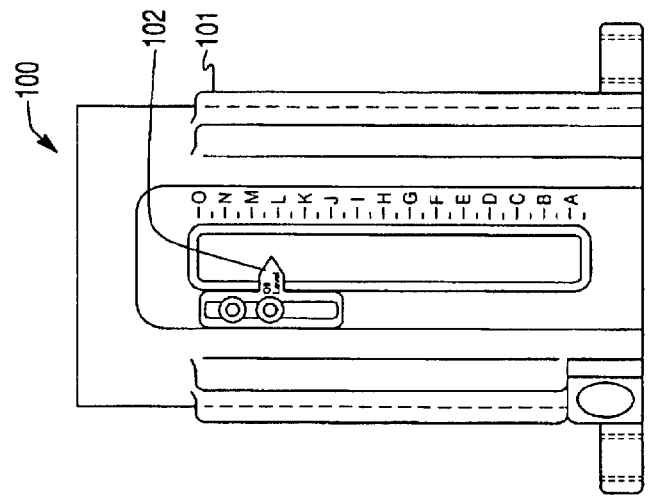
Figure 6A:
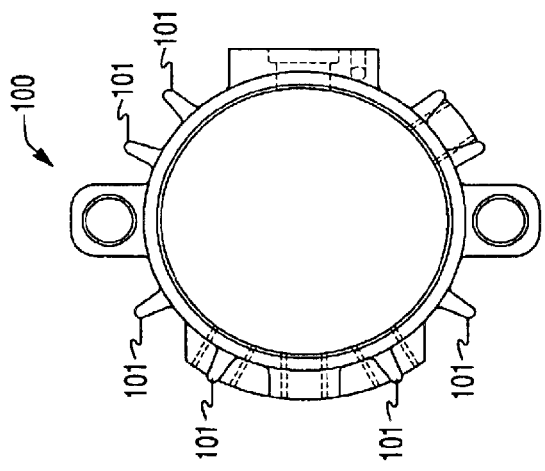

FIG. 3 is an alternate view of the pump shown in FIG. 2 showing the external oil reservoir 100 with fins 101, adjustable oil level arrow 102, adjustable support screws 104, and cover with desiccant chamber 106 (see also FIGS. 6a–6c). The present invention uniquely provides a kit assembly that may be retrofit onto an existing pump. To install the external reservoir to an existing pump, one simply removes the existing sight glass or constant level oiler from the side of the bearing frame. The reservoir 100 simply installs into the same port on the side of the bearing frame, and the reservoir 100 automatically adjusts the oil level downward so that the bearings are no longer flooded and not plowing through the lubricant.

Once mounted to the pump bearing frame, the position of the oil level set point arrow 102 is set on the face of the reservoir 100 according to a predetermined position set by the manufacturing specifications for the pump. The adjustable support screws 104 are used to support the reservoir 100. These adjustable support screws 104 function as mounting feet to alleviate stress on the connecting pipes leading to and from the reservoir 100.

Figure 4:
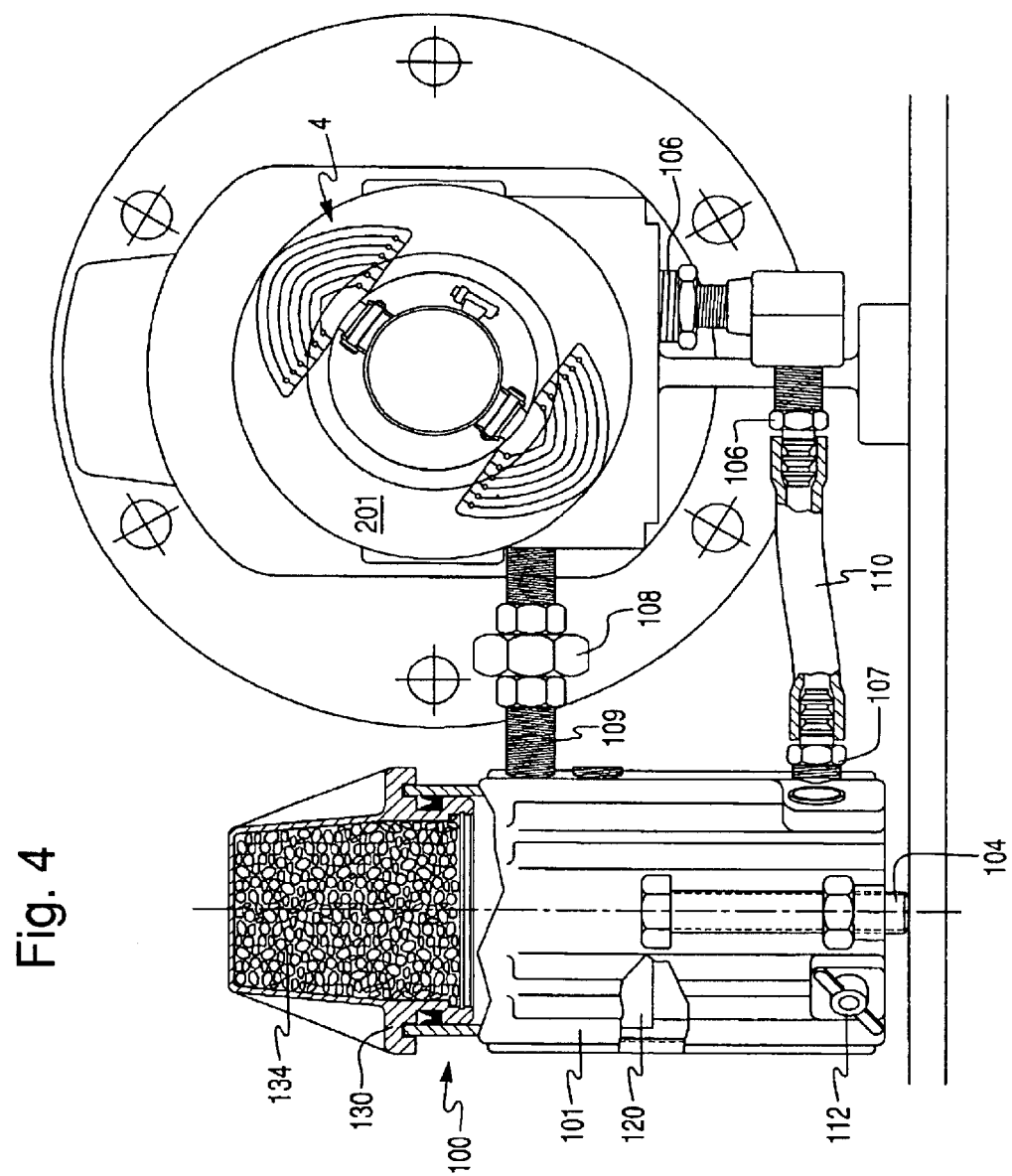

FIG. 4 is a cross sectional end view taken along section line IV—IV of FIG. 3 showing the adjustable oil misting blade assembly 4 mounted on the shaft, as well as fittings 106–108, tubing 109–110, drain valve 112, plugs, reservoir 100 with fins 101, adjustable support screws 104, filter 120 inside the reservoir 100, and reservoir cover 130 with desiccant chamber 134.

The reservoir 100 shown in FIG. 4 provides a remote lubricant flow path that passes from the main lubricating chamber 201 through tubing 109 where it passes through filter 120 and is returned via tubing 110 to the lubricating chamber 201. Desiccant chamber 134 is provided to remove water content from the air within chamber 201 and reservoir 100. The desiccant chamber 134 includes a substance, such as calcium oxide, that has a high affinity for water and is used as a drying agent.

Figure 7:
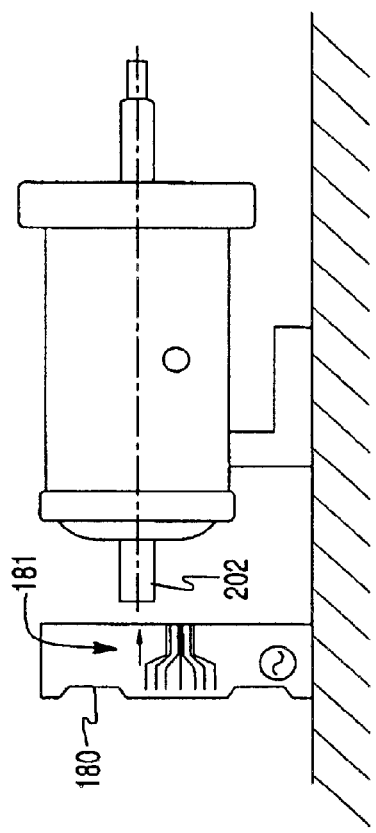

One important aspect of this invention is the slide rule template used to measure the correct positioning of the components of the present invention. For example with reference to FIG. 7, with the shaft still mounted in the bearing frame, one can use the slide rule template 180 provided in the retrofit kit as follows: position the bearing frame/shaft assembly on a flat surface with the shaft 202 parallel to the surface, then position the slide rule vertically on the surface as shown. Next, move the vertical slide up or down until the arrow marked shaft centerline 181 is positioned exactly at the centerline of the shaft. Take note of the position of the slide template relative to the ruler printed on the template so that if the slide moves, it can be repositioned (fasten with tape if desired).

Figure 8:
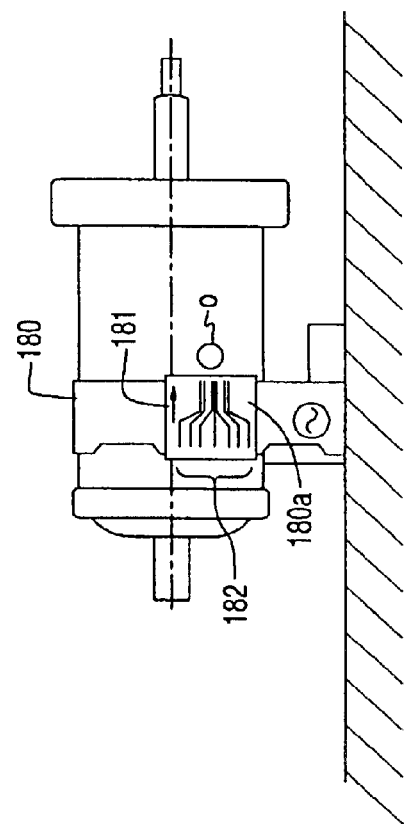

Next, with reference to FIG. 8 move the slide rule template 180 to the side of the bearing frame outlet 'o' where the reservoir tubing 109 will be mounted (see FIG. 4), and locate the line 182 on the template corresponding to the size of the bearings in the pump. If the bearings are different sizes, the line corresponding to the largest of the two bearings (i.e. the lowest of the two lines on the template) is used. The best vertical position of the threaded hole in which the reservoir tubing 109 will be mounted will be at height indicated according to the bearing size in the pump. If the vertical position of the existing hole for tubing 109 differs by more than ¼", optimal performance can be achieved by drilling and tapping a new hole (¼"-18 NPT) at the preferred height (although not required) as close as possible to half way between the two bearings in the pump. The preferred height as indicated on the template 180 is where the oil level will be set later regardless of the actual position of the mounting hole for the reservoir.

Next, with reference to FIG. 9, set the position of the "oil level set point arrow" 102 in FIG. 3 on the face of the reservoir 100. With the shaft mounted in the bearing frame, use the slide rule template 180 provided in the kit as follows: position the bearing frame/shaft assembly on a flat surface with the shaft parallel to the surface. Position the slide rule vertically on the surface as shown. Move the vertical slide 180a up or down until the arrow marked shaft centerline 181 is positioned exactly at the centerline of the shaft 202. Take note of the position of the slide 180a relative to the ruler printed on the template so that if the slide moves, it can be repositioned (fasten with tape if desired). Move the slide rule template close to the face of the reservoir where the oil level set point arrow 102 is located. Locate the line on the template corresponding to the size of the bearings in the pump. If the bearings are different sizes, use the line corresponding to the largest of the two bearings (i.e. the lowest of the tow lines on the template). Fasten the arrow to the face of the reservoir so that the point of the arrow is at the same height as the line corresponding to the bearing size. Install and adjust as necessary the height of the adjustment bolts 104 (see FIGS. 3 and 4). These bolts 104 only function as "mounting feet" for the reservoir to alleviate the weight of the reservoir from pulling down on the connection pipe. Adjust these bolts accordingly so as not to apply stress to the connection pipe.

Figure 10A:
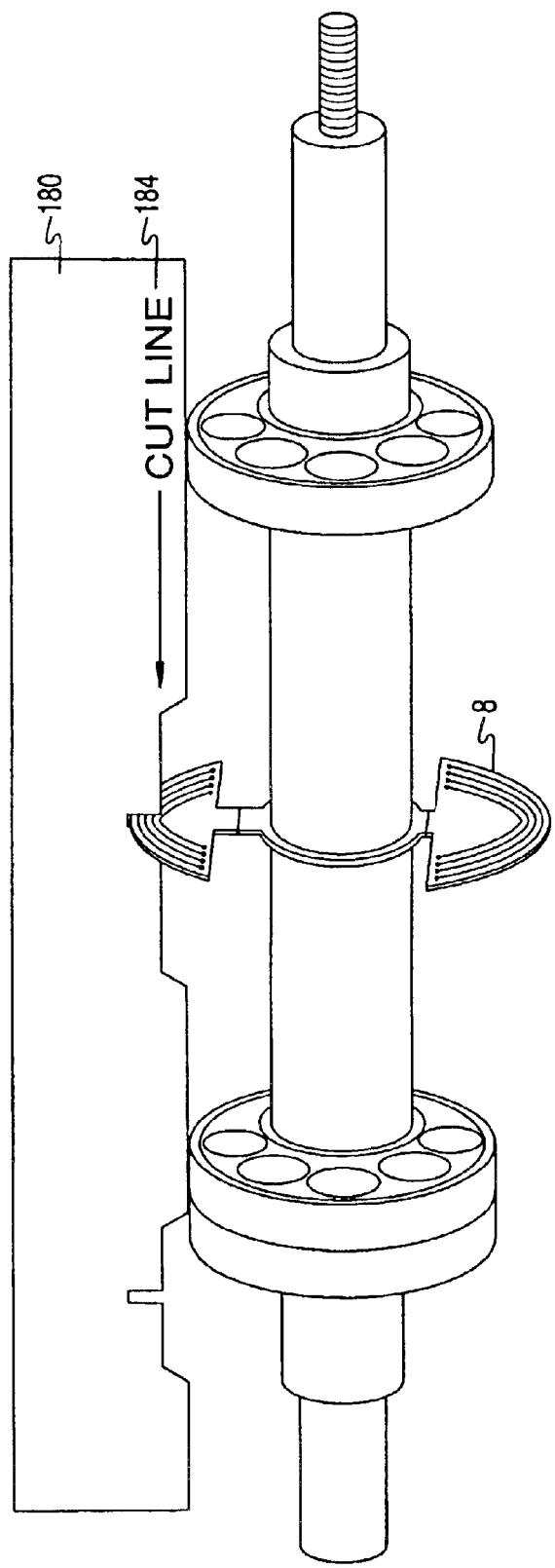
Figure 10B:
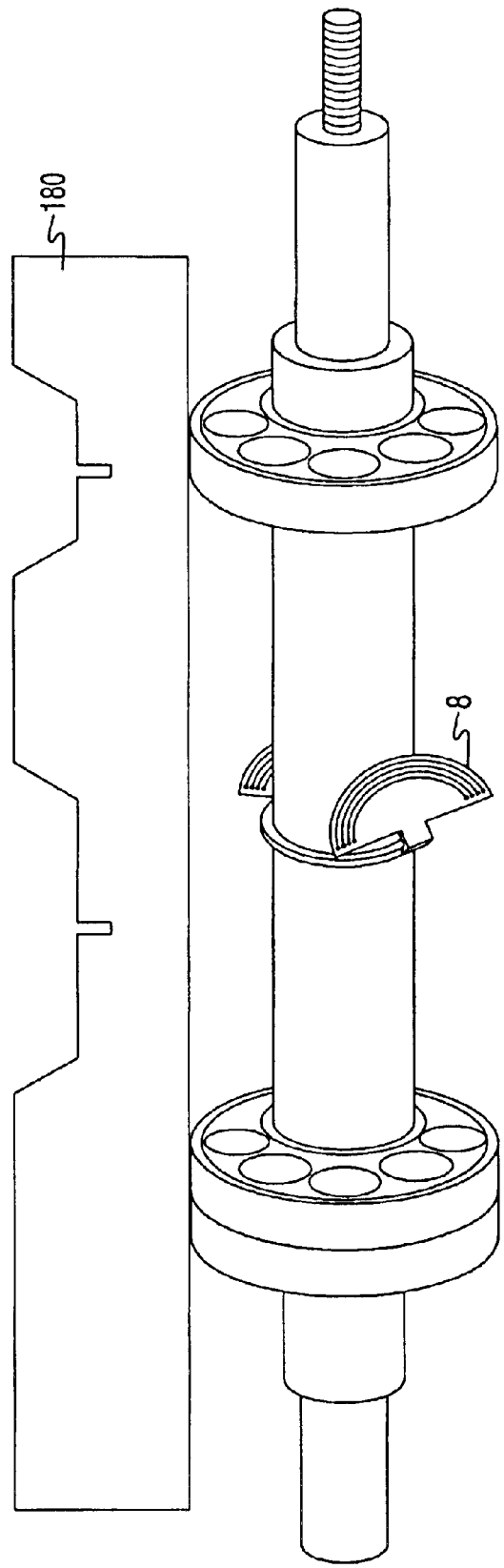

FIGS. 10a and 10b illustrate how the slide rule template 180 can alternatively be used to measure the proper size of the blade 8 of the dispenser 4. The cut line 184 shows where the blades should be trimmed to a maximum diameter.

Numerous advantages are provided by the aforementioned lubrication system for pumps and other rotating components. The invention allows the bearings to operate as much as 50–60° F. cooler by eliminating the viscous drag and plowing effect created by submerged bearings. The invention reduces power consumption slightly by reducing viscous drag that was converted to non-productive heat. The invention adds reserve oil capacity (in most cases doubles) to the pump. The invention continuously filters the oil as it circulates. The invention continuously removes water from the air in the bearing frame and reservoir. The invention adds cooling capacity to the system, both by the external reservoir and by utilizing the entire internal surface of the bearing frame as a heat sink. The invention continuously coats the internals of the bearing frame with oil to minimize any oxidation of iron and steel parts. Because bearing and oil operating temperatures are significantly lower, condensate formation is minimized due to lower differential temperatures. The system allows the use of a closed frame without vents or breathers, which are a prime source for moisture infiltration. When combined with bearing isolators (labyrinth oil seals) which are very effective at keeping oil in, and keeping contaminants out, at the shaft level, the invention makes a significant contribution to any plant program aimed at productivity and cost reduction.

While the foregoing invention has been shown and described with reference to the preferred embodiments, it will be understood by those of skill in the art that various changes in form and detail may be made therein without departing from the spirit and scope of the instant invention.

What is claimed is:

1. A lubrication system for pumps and other rotating equipment, for circulating lubricant to and from a main lubrication chamber, wherein said rotating equipment comprises a bearing housing for receiving at least a pair of bearings; a rotatable shaft disposed within said housing, said main lubricating chamber being annular and surrounding said shaft; and bearings to be lubricated, said bearings rotatably supporting said shaft and being located within or adjacent said main lubricating chamber, said lubrication system comprising:

a lubricant dispensing member affixed to said shaft within said main lubricating chamber for dispensing the lubricant in said main lubricating chamber for lubricating said bearings; and a lubricant reservoir remote from and in fluid communication with said main lubricating chamber, wherein the said lubricant is circulated out of said main lubricating chamber and into said reservoir via a first fluid conduit, and thereafter is circulated back into said main lubricating chamber from said reservoir via a second conduit, wherein the lubricant dispensing member is adapted to be mounted to said shaft without removing the bearings from said shaft.

2. The lubrication system of claim 1, wherein the lubricant dispensing member includes means of adjusting its radial size to fit any size said main lubricating chamber.

3. The lubrication system of claim 1, wherein the lubricant dispensing member is of a radial size that is larger than the radial size of said bearings, said dispensing member adapted to be mounted onto said shaft and then inserted into said main lubricating chamber as allowed by its pivoting blade assembly.

4. The lubrication system of claim 1, wherein the lubricant reservoir includes heat removing fins.

5. The lubrication system of claim 1, wherein the lubrication reservoir includes a filter to remove contaminants from the oil.

6. A lubrication system for pumps and other rotating equipment, for circulating lubricant to and from a main lubrication chamber, wherein said rotating equipment comprises a bearing housing for receiving at least a pair of bearings; a rotatable shaft disposed within said housing, said main lubricating chamber being annular and surrounding said shaft; and said bearings are to be lubricated, said bearings rotatably supporting said shaft and being located within or adjacent said main lubricating chamber, said lubrication system comprising:

a lubricant dispensing member affixed to said shaft within said main lubricating chamber for dispensing the lubricant in said main lubricating chamber for lubricating said bearings; and a lubricant reservoir remote from and in fluid communication with said main lubricating chamber, wherein said lubricant is circulated out of said main lubricating chamber and into said reservoir via a first fluid conduit, and thereafter is circulated back into said main lubricating chamber from said reservoir via a second conduit, wherein the lubrication reservoir includes an adjustable support to the reservoir to provide improved versatility in retrofitting all rotating equipment.

7. The lubrication system of claim 6, wherein the lubrication reservoir includes a drain valve and cover for draining the oil and refilling the reservoir.

8. A lubrication system for pumps and other rotating equipment, for circulating lubricant to and from a main lubrication chamber, wherein said rotating equipment comprises a bearing housing for receiving at least a pair of bearings; a rotatable shaft disposed within said housing, said main lubricating chamber being annular and surrounding said shaft; and said bearings are to be lubricated, said bearings rotatably supporting said shaft and being located within or adjacent said main lubricating chamber, said lubrication system comprising:

a lubricant dispensing member affixed to said shaft within said main lubricating chamber for dispensing the lubricant in said main lubricating chamber for lubricating said bearings; and a lubricant reservoir remote from and in fluid communication with said main lubricating chamber, wherein said lubricant is circulated out of said main lubricating chamber and into said reservoir via a first fluid conduit, and thereafter is circulated back into said main lubricating chamber from said reservoir via a second conduit, wherein the lubrication reservoir includes a cover that contains a desiccant chamber for removing moisture from the air within the main lubricating chamber and from within the external reservoir for reducing moisture in the oil.

9. The lubrication system of claim 8, wherein the lubrication reservoir includes a set of embossed letters at predetermined oil set levels to provide ease of setting an oil level for a plurality of rotating equipment for which the oil level has been previously determined.

10. The lubrication system of claim 8, wherein the lubrication reservoir includes an adjustable oil level arrow to provide improved versatility in retrofitting rotating equipment.

11. The lubrication system of claim 8, wherein the lubrication reservoir includes a full length sight glass to enable the oil level to be visible to provide improved versatility in retrofitting said rotating equipment and providing a means of visually assessing the condition of the oil in the reservoir.

12. A lubrication system for pumps and other rotating equipment, for circulating lubricant to and from a main lubrication chamber, wherein said rotating equipment comprises a bearing housing for receiving at least a pair of bearings; a rotatable shaft disposed within said housing, said main lubricating chamber being annular and surrounding said shaft; and said bearings are to be lubricated, said bearings rotatably supporting said shaft and being located within or adjacent said main lubricating chamber, said lubrication system comprising:

a lubricant dispensing member affixed to said shaft within said main lubricating chamber for dispensing the lubricant in said main lubricating chamber for lubricating said bearings; and a lubricant reservoir remote from and in fluid communication with said main lubricating chamber, wherein said lubricant is circulated out of said main lubricating chamber and into said reservoir via a first fluid conduit, and thereafter is circulated back into said main lubricating chamber from said reservoir via a second conduit, wherein said lubricant dispensing member and said lubricant reservoir define a retrofit kit mounted adjacent said rotating components, and wherein the retrofit kit includes an installation slide template to assist in the setting of the oil misting blade length and a level of the oil for said rotating equipment without the need for the customer to have special measuring equipment.

13. The lubrication system of claim 12, wherein said oil level in said main lubricating chamber is maintained below lower balls of said bearings.

* * * * *